(12) United States Patent
Tynan, Jr. et al.

(10) Patent No.: US 8,912,119 B2
(45) Date of Patent: Dec. 16, 2014

(54) PRESSURE-CHROMIC TAPE AND METHODS OF MAKING SAME

(71) Applicant: Intertape Polymer Corp., Bradenton, FL (US)

(72) Inventors: John K. Tynan, Jr., Port Huron, MI (US); James Apap Bologna, Sarasota, FL (US)

(73) Assignee: Intertape Polymer Corp., Sarasota, FL (US)

( * ) Notice: Subject to any disclaimer, the term of this patent is extended or adjusted under 35 U.S.C. 154(b) by 245 days.

(21) Appl. No.: 13/665,293

(22) Filed: Oct. 31, 2012

(65) Prior Publication Data

US 2013/0122290 A1  May 16, 2013

Related U.S. Application Data

(60) Provisional application No. 61/553,628, filed on Oct. 31, 2011.

(51) Int. Cl.
*B41M 5/128* (2006.01)
*B41M 5/165* (2006.01)
*C09J 7/02* (2006.01)
*C09J 7/00* (2006.01)

(52) U.S. Cl.
CPC . *C09J 7/00* (2013.01); *B41M 5/128* (2013.01); *C09J 7/0207* (2013.01); *B41M 5/165* (2013.01)
USPC ........... 503/215; 427/150; 427/152; 503/206; 503/226

(58) Field of Classification Search
CPC ....... B41M 5/128; B41M 5/165; C09J 7/0207
USPC ................... 503/206, 215, 226; 427/150, 152
See application file for complete search history.

(56) References Cited

U.S. PATENT DOCUMENTS

| | | |
|---|---|---|
| 3,078,182 A | 2/1963 | Crone, Jr. et al. |
| 3,672,935 A | 6/1972 | Miller et al. |
| 3,919,450 A | 11/1975 | Shimizu et al. |
| 3,935,960 A | 2/1976 | Cornell |
| 3,981,523 A | 9/1976 | Maalouf |
| 4,557,505 A | 12/1985 | Schaefer et al. |
| 4,781,957 A | 11/1988 | Brown et al. |
| 4,868,152 A | 9/1989 | Foulds et al. |
| 4,962,009 A | 10/1990 | Washizu et al. |
| 5,053,339 A | 10/1991 | Patel |
| 5,145,079 A | 9/1992 | Woodrow et al. |

(Continued)

OTHER PUBLICATIONS

International Search Report and Written Opinion, International Application No. PCT/US2012/062733 (Jan. 8, 2013).

*Primary Examiner* — Bruce H Hess
(74) *Attorney, Agent, or Firm* — Thompson Hine L.L.P.

(57) ABSTRACT

Masking tapes that changes color when the tape is rubbed down or dispensed onto an adherend and methods of making such tapes are disclosed herein. The tape includes a backing, a layer of adhesive on the bottom surface of the backing, and a release structure on the top surface of the backing that includes a pressure-chromic indicator and a release layer. The pressure-chromic indicator is characterized in that it is not activated by the pressure applied during the manufacturing process, but is activated by the pressure applied when the tape is rubbed or dispensed onto an adherend.

14 Claims, 3 Drawing Sheets
(2 of 3 Drawing Sheet(s) Filed in Color)

(56) References Cited

U.S. PATENT DOCUMENTS

| | | | |
|---|---|---|---|
| 5,206,118 A * | 4/1993 | Sidney et al. | 430/343 |
| 5,325,721 A | 7/1994 | Pendergrass, Jr. | |
| 5,372,917 A | 12/1994 | Tsuchida et al. | |
| 5,478,793 A | 12/1995 | Tsuchida et al. | |
| 5,980,485 A | 11/1999 | Grantz et al. | |
| 6,086,966 A | 7/2000 | Gundjian et al. | |
| 6,442,316 B1 | 8/2002 | Rossi et al. | |
| 7,252,880 B2 | 8/2007 | Posa et al. | |
| 2005/0075420 A1 | 4/2005 | Stovold | |
| 2005/0238834 A1 | 10/2005 | Bourdelais et al. | |
| 2005/0258634 A1 | 11/2005 | Dronzek, Jr. | |
| 2012/0242009 A1 | 9/2012 | Mullane et al. | |

* cited by examiner

PRESSURE-CHROMIC TAPE AND METHODS OF MAKING SAME

RELATED APPLICATIONS

This application claims the benefit of U.S. Provisional Application No. 61/553,628, filed Oct. 31, 2011, which is fully incorporated herein by reference.

FIELD OF THE INVENTION

The present invention relates to an adhesive tape containing a pressure-color adhesion indicator.

BACKGROUND OF THE INVENTION

Adhesive tapes are well known in the art. In recent years, several approaches have been taken to provide premium-quality masking tapes. These approaches have focused on improving the adhesive so that adhesive remnants are not left behind upon removing the tape, and providing an edge coating on the tape to prevent paints and other liquids from wicking into the paper or fabric substrate for the tape or from bleeding between the tape substrate and the adherend. These improvements, however, are dependent upon proper application of the tape to the adherend. If wrinkles occur when the tape is applied or the adhesive is unevenly adhered to the adherend, gaps can occur between the tape and the adherend where paints or liquids can bleed and mar the line of demarcation. Accordingly, there is a need for an adhesive tape that provides a visual indication that pressure was applied along the entire length of the tape when applying the tape to an adherend.

The visual indication may be a color change. One well known color change system is found in carbonless paper laminates. The laminates employ a color precursor or color-forming agent, usually colorless, and a color activator that react to form a visible image. The carbonless laminates can comprise two sheets, a transfer sheet that contains a colorless color-forming agent on one of its surfaces, which is often contained in pressure rupturable microcapsules, and a receiver sheet that is typically a substrate having a layer of a color activator material coated onto its front surface. This dual sheet system is not practical for adhesive tapes.

Accordingly, there is a need for an improved adhesive tape that includes a color change system to indicate that pressure has been applied along the entire length of a piece of masking tape, such that the user receives a visual indication if they applied less pressure or no pressure over a portion of the length of the tape. Errors of this nature in the application of a masking tape could result in paints or other liquids bleeding between the tape and the adherend.

SUMMARY OF THE INVENTION

One aspect of the invention is a pressure-chromic tape, and, more particularly, a masking tape including a pressure-chromic indicator that upon activation provides an indication of the relative pressures applied when rubbing down or dispensing the tape onto an adherend.

In one embodiment, the pressure-chromic tape includes a backing having a top surface, a bottom surface, and at least a first edge extending between the top surface and the bottom surface, a layer of adhesive on the bottom surface of the backing, and a release structure on the top surface of the backing. The release structure includes a pressure-chromic indicator and a release layer. The pressure-chromic indicator is characterized in that it is not activated by the pressure applied during the manufacturing process, but is activated by the pressure applied when the tape is rubbed or dispensed onto an adherend.

In one embodiment, the pressure-chromic tape also includes a barrier layer. The barrier layer is applied directly to the top surface of the backing to act as a barrier from substances in the pressure-chromic indicator and/or release layer from absorbing into the backing.

Another aspect of the invention includes methods of making the pressure-chromic tape. In one embodiment, the method includes providing a backing that has a top surface, a bottom surface and at least a first edge extending between the top surface and the bottom surface, applying a layer of adhesive onto the bottom surface of the backing, and applying a release structure on the top surface of the backing. The release structure includes a release layer and a pressure-chromic indicator, which is characterized in that it is not activated by the pressure applied during the method of making, but is activated by the pressure applied when the tape is rubbed or dispensed onto an adherend.

In another embodiment, the application of the release structure includes continuously applying, spot-coating or printing the pressure-chromic indicator on the backing and subsequently over-coating the pressure-chromic indicator with the release layer.

In another embodiment, the release structure also includes a barrier layer applied directly to the top surface of the backing. Accordingly, the method includes the step of applying the barrier layer directly to the top surface of the backing before applying the pressure-chromic indicator and the release layer. And, if the pressure-chromic indicator is present as a separate layer from the release layer, the method will include the steps of applying the pressure-chromic indicator to the barrier layer and then subsequently applying the release layer over the pressure-chromic indicator.

BRIEF DESCRIPTION OF THE DRAWINGS

The patent or application file contains at least one drawing, specifically the photographs submitted as FIGS. 4-7, executed in color. Copies of this patent or patent application publication with color drawing(s) will be provided by the Office upon request and payment of the necessary fee.

DETAILED DESCRIPTION

Figure 1:
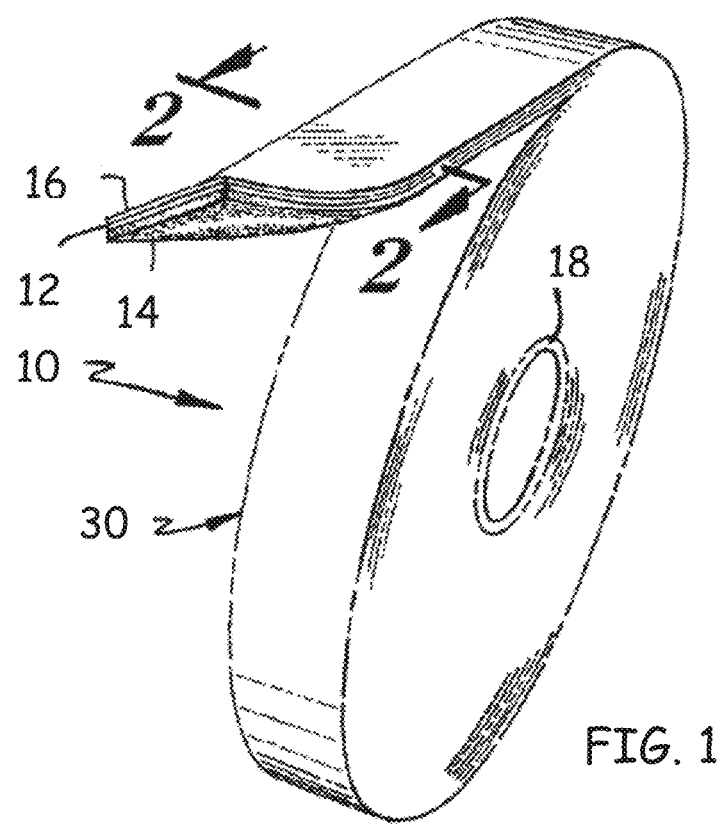
FIG. 1 is a perspective view of a roll of masking tape for one embodiment of the invention.

The following detailed description will illustrate the general principles of the invention, examples of which are additionally illustrated in the accompanying drawings. In the drawings, like reference numbers indicate identical or functionally similar elements.

Figure 2:
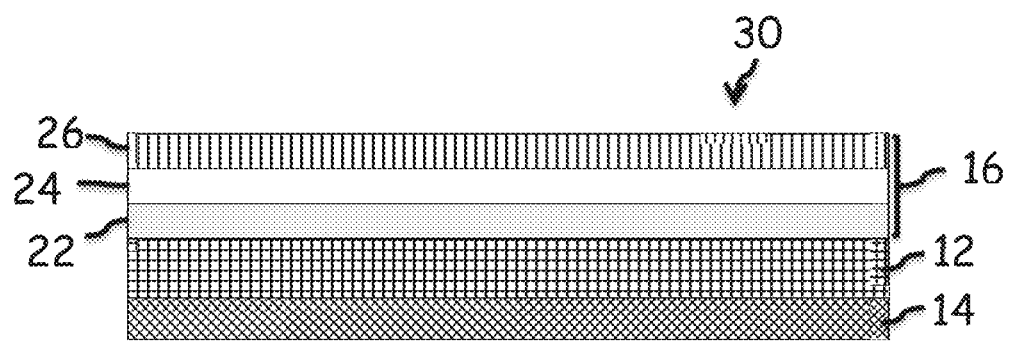
FIG. 2 is an enlarged cross-sectional view of the pressure-chromic masking tape of FIG. 1, illustrating the layers that comprise the release structure disposed on the backing.
Figure 3:
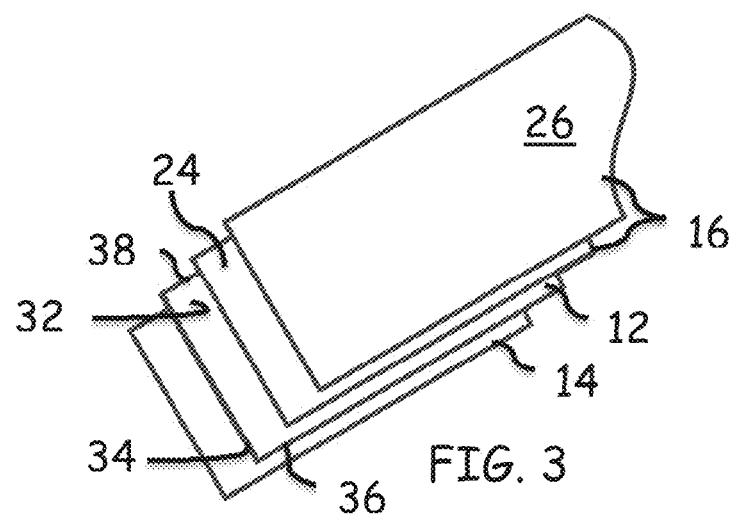
FIG. 3 is an exploded view of a section of tape of one embodiment of masking tape having a pressure-chromic layer.

FIG. 1 illustrates a roll 10 of masking tape 30 wound onto a core 18 that includes a pressure-color adhesion indicator. The tape 30 as seen in the cross-section of FIG. 2 includes a plurality of layers applied to a backing 12 (also referred to as a substrate). The backing 12 has a top surface 32, a bottom surface 34, a first edge 36, and a second edge 38 as labeled in the exploded view of FIG. 3. With respect to FIGS. 1-3, applied to the bottom surface 34 of the backing 12 is an adhesive layer 14 and applied to the top surface of the backing 12 is a release structure 16. The release structure 16 includes an optional barrier layer 22 (FIG. 2), a pressure-chromic indicator and a release layer, which is present as separate layers are pressure-chromic indicator layer 24 and release layer 26 (FIGS. 2 and 3). The pressure-color indicator layer 24 is applied to the backing 12 on the surface opposite the adhesive layer 14 (the top surface with respect to the orientation of the figures with respect to the page). In one embodiment, the pressure-color indicator may be included in the release layer 26, rather than being a separate layer.

Backing layer 12 may be a creped paper, synthetic substrate, or other materials known to one of skill in the art as suitable for a backing layer. Creped NBSK (Northern Bleached Softwood Kraft) paper web is one suitable backing for use in this invention. Alternatively, depending on the intended use of the adhesive tape 10, suitable web-form carrier materials for the self-adhesive compositions processed and produced in accordance with this disclosure are all known carriers, with or without appropriate chemical or physical surface pretreatment of the coating side, and anti-adhesive physical treatment or coating of the reverse side. Representative examples include: creped, non-creped, and release papers, polyethylene, polypropylene, polyisobutylene, polyamides, cellulose acetate, copolymers of vinyl chloride and vinyl acetate, polyvinyl chloride, polyvinylidene chloride, polyvinyl butyral, polystyrene, polytrifluorochloroethylene, synthetic rubbers such as butadiene-styrene and ABS polymers, mono or biaxially oriented polypropylene films, polyester, PVC, release and other films, as well as foamed materials, wovens, knits, and nonwovens in web form made from polyolefins. In an embodiment where the pressure-chromic indicator is water-based, some of the representative backings may be less suitable, such as synthetic rubbers and polypropylene films.

In one embodiment, the backing 12 may include a saturant. The saturant may be applied by soaking, immersing, coating, and/or dipping the backing layer 12 with/in a saturant, or by other known methods. In one embodiment, the backing 12 may be in the form of a web, weave, or other construction that includes voids between the material forming the backing such that the saturant can surround the individual materials. After being soaked, immersed, coated, or dipped into the saturant for a period of time sufficient to saturate the web, the web is removed, optionally squeezed to remove excess saturant, and dried.

The application weight of the saturant is generally about 15 g/m² to about 75 g/m². In one embodiment the saturant has an application weight of about 15 g/m² to about 60 g/m². In another embodiment the saturant has an application weight of about 15 g/m² to about 40 g/m². In another embodiment, the saturant has an application weight of about 15 g/m² to about 30 g/m². The saturant can be any polymer emulsion, colloid dispersions, solutions or mixtures thereof. The saturant may be applied by any means known to those skilled in the art. For example, the saturant may be sprayed, brushed, flexographic coated, gravure roll coated, or immersed onto the web without departing from the scope of this invention. The saturant is advantageous because it provides added strength to the tape backing.

As shown in FIGS. 1-3, a pressure sensitive adhesive 14 is applied to one surface of backing 12, such as the bottom surface 34 labeled in FIG. 3. The adhesive layer 14 may be applied to backing 12 as a solvent-cast, aqueous, solventless, or molten film or as a coating layer using either extrusion, any manner of roll, knife, rod, or blade coating, curtain coating or any suitable method. In one embodiment, the adhesive coating layer thickness may range from about 0.1 mil to about 2.5 mil.

Pressure sensitive adhesives (PSA) are elastomeric-based adhesives that "wet out" at room temperature. Typical varieties of PSA's are derived from natural rubber, synthetic rubber, acrylic, silicone and modifications thereof. The following adhesive compounds, solutions, or emulsions may be used, either alone or in combination, without departing from the scope of this invention. Suitable rubber-based adhesives include, but not limited to, natural rubber, synthetic polyisoprene, styrene-isoprene-styrene block copolymer (SIS), styrene-butadiene-styrene block copolymer (SBS), styrene-ethylene-butylene-styrene block co-polymer (SEBS), styrene-ethylene-propylene-styrene block copolymer (SEPS), styrene butadiene rubber, nitrile rubber, neoprene rubber, butyral and butyl rubber, polyisobutylene, polysulfide rubber, silicone rubber, natural latex rubber, and synthetic latex rubber. Suitable resin-based adhesives include, but not limited to, polyvinyl acetate, polyvinyl butyral, polyvinyl chloride, acrylic, ethylene vinyl acetate, polyethylene-based, polyolefin based, nylon-based, phenol-based (including formaldehyde-based), urea-based (including formaldehyde-based), epoxy resin, polyurethane-based, rosin-based (including rosin esters), polyterpene-based, polyester, petroleum based, and low molecular weight based adhesives.

The barrier layer 22 is disposed on backing 12 on the surface opposite the surface having the adhesive layer 14, such as the top surface 32 in FIG. 3. One function of the barrier layer 22 is to prevent the agents or chemicals contained in the pressure-chromic indicator 24 and/or the release layer 26 from migrating into the backing 12 and/or the adhesive layer 14. The pressure-chromic indicator 24 experiences a color change during use and it is likely undesirable for the color of the indicator to migrate through the tape into contact with the adherend. Typically, the adherend is the surface being protected from the application of paint, so the application of the color by the tape itself would be undesired. It is also possible that the agents or chemicals of the pressure-chromic indicator 24, if able to migrate into the backing or adhesive, could interfere with the adhesive properties of the tape. Another reason a barrier layer 22 is advantageous is that it prevents the pressure-chromic indicator 24 from being absorbed into the backing 12 during the manufacturing process. This is important because the pressure-chromic indicator 24 is likely to be the most expensive component and absorption thereof into the backing will increase the amount applied during manufacturing. Thus, the barrier layer 22 may be desirable in certain embodiments of the inventive masking tape.

In another embodiment, if the backing 12 itself is not susceptible to absorbing the agents or chemicals of the pressure-chromic indicator 24 or from the release layer 26 or they do not adversely affect the adhesive, the barrier layer 22 may be unnecessary.

The tape 30 optionally includes a release layer 26, for example a silicone release coating, which allows the tape to be self-winding into rolls. The release layer 26 is not limited to a silicone release coating, but may be any other suitable release system known to one of skill in the adhesive and/or tape art. In another embodiment, the pressure-chromic indicator is included in the release layer 26. Release layer 26 may therefore contain a sealing material that prevents the resulting color from exiting tape 30 and mingling with paints or coatings on the adherend or from getting on the user's hands.

The thickness of layers 22, 24, and 26 may be minimized relative to the thickness of the backing 12 and the adhesive layer 14 by applying them via any of the conventional printing, coating or air-brushing techniques known in the art. Thickness is one mechanism for maintaining the aesthetics and the performance of the tape 30 and minimizing the direct material cost thereof.

The pressure-chromic indicator is a color indicator that is activated by the application of pressure to the tape while adhering the tape to an adherend, i.e., the "rub down," yet is not activated by the pressures applied during the tape's manufacturing process. The "rub down" may be the the pressure typically applied when an end user runs or rubs a hand along the tape while applying the tape to an adherend or the pressure applied by a tool such as a roller or tape dispenser to press the adhesive against the adherend. The pressure applied during the rub down may be about 100 kPa to about 10,000 kPa. In one embodiment, the pressure applied during rub down may be about 1000 kPa to 7000 kPa. The pressure-chromic indicator may originally be a colorless layer, but after the application of such pressure undergoes a chemical change to a color such as, but not limited to, black, blue, green, or red.

Figure 4:
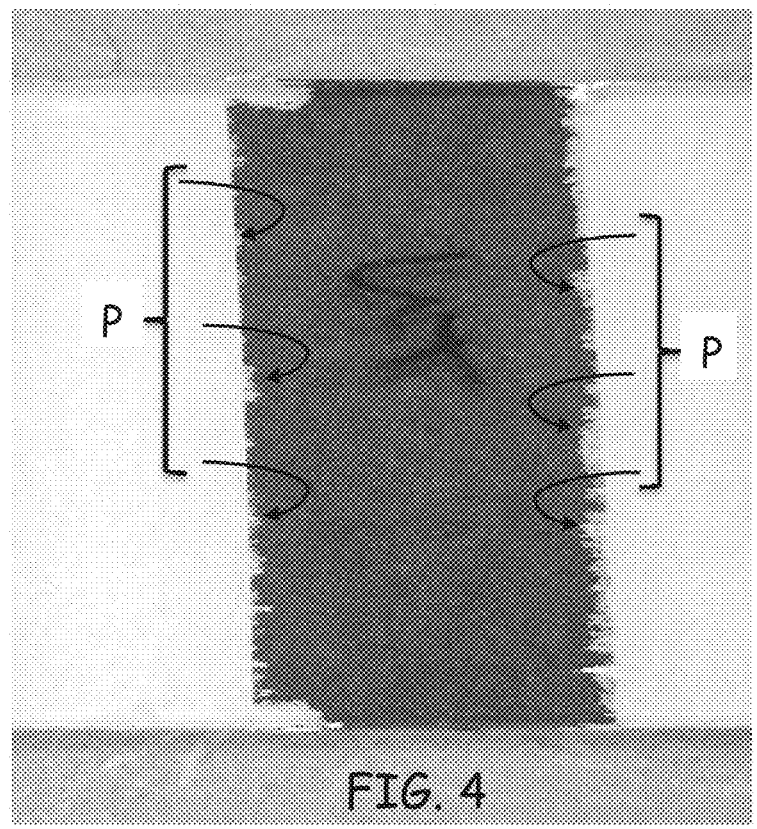
FIG. 4 is a photograph of an untreated masking tape applied to a glass plate, which was painted over to illustrate the concept of paint bleeds.

An objective of the masking tape described herein is to provide a color change indicative of the pressure used to rub down the tape. For example, if applying the masking tape around a door frame to protect it from the paint applied to the wall, the tape will be a darker shade of blue, for example, where the end user pressed harder when applying the tape, a light shade where less pressure was applied, and no color change is no pressure or too little pressure was applied. The benefit to this tape is the indication the ender user receives, especially if they missed a section of the tape during the rub down. A section of tape that is still the original color will be easily identified against the nearby section that has turned blue. The end user can now go back and rub down the missed section to improve the tape's ability to protect against paint bleeds. Paint bleeds are lines of paint that seep under a piece of masking tape, see the photograph of paint bleeds "P" found under a normal untreated ("UT") masking tape (no pressure-chromic indicator is present therein) included as FIG. 4.

The pressure-chromic indicator comprises a color-forming reactant pair. The color-forming pair includes a color activator, also referred to as a developer, and a color precursor. Such chromogenic pairs are known in the art and typically the color precursor is substantially colorless until connected with and/or reacted with the color activator. The color activator and the color precursor may both be microencapsulated and at least one of them is encapsulated in a pressure-rupturable capsule. U.S. Pat. No. 3,981,523 to Maalouf, incorporated herein by reference in its entirety, describes various possible color precusors including encapsulation thereof and other initially colorless forming systems for use in carbonless forms that may be useful here. Additionally, encapsulated color precursor and/or encapsulated developer can be made by companies such as Appleton of Appleton, Wis., Microtek Laboratories, Inc. of Dayton, Ohio, or Chromatic Technologies, Inc. of Colorado Springs, Colo.

In one embodiment, the color precursor is electron-donating and the color activator is electron-accepting. The color precursors used in one embodiment of the present invention include those precursors which have previously been taught for use in microencapsulated imaging systems. In one embodiment, these materials are substantially colorless electron-donating type compounds which react with an electron-acceptor like acid clay or acid resin to generate a dye. A substantially colorless material may be clear or white, but does not exhibit any hue of the color to which it will change. Representative examples of such color formers include substantially colorless compounds such as leuco dyes having in their partial skeleton a lactone, a lactam, a sulfone, a spiropyran, an ester or an amido structure. Specifically, there are triarylmethane compounds, bisphenylmethane compounds, xanthene compounds, thiazine compounds, spiropyran compounds and the like. In addition to leuco dyes, known color-forming redox couples can be used.

In one embodiment, the color precursor is microencapsulated; however, in other embodiments, the color precursor may simply be dispersed in a polymeric layer. Microencapsulation can be accomplished by a variety of known techniques including interfacial polymerization, polymerization of one or more monomers in an oil, as well as various melting, dispersing and cooling methods. The choice of wall-forming material depends on the color developer to be encapsulated and the time interval the indicator is designed to signal. The capsule can be capable of containing the developer without excessive leakage or exudation through the capsule wall until the tape product is applied. The capsules must be able to withstand normal handling and processing forces without rupturing but rupture when pressed in the process of applying the tape. Wall-forming materials which may be useful in the present invention include gelatin, gum arabic, polyvinyl alcohol, carboxymethyl cellulose, resorcinol-formaldehyde, isocyanate, polyurethane, urea formaldehyde wall-formers and more particularly urea-resorcinol-formaldehyde wall formers, melamine-formaldehyde resin, hydroxypropyl cellulose and polyurea.

The encapsulated portion of the color-forming reactant pair may be housed within an inert, very stable polymer (i.e., the wall material). The chemical housed within the capsule wall, for example the color precursor, is typically referred to as the core. The capsules may comprise 70% to 95% core and 30% to 5% wall material. In one embodiment, the capsule may comprise about 85% core and 15% wall material. The resulting capsule may have a mean particle size of about 1 micron to about 1000 microns. In one embodiment, the capsules may have a mean particle size of about 2 microns to about 50 microns, or about 2 microns to about 25 microns, or about 2 microns to about 10 microns, or about 2 microns to about 5 microns.

In one embodiment, the color precursor is encapsulated as discussed above and the capsules are mixed with the developer. This mixture may be an aqueous-based slurry and when in slurry form may include about 20 to 50% solids or about 35 to 45% solids. In one embodiment, the mixture includes a 1:10 ratio of encapsulated color precursor to developer.

The pressure-chromic indicator may be continuously applied, spot-coated or printed on the backing of the tape and over-coated with a release layer.

In this connection, it should be pointed out that the exact nature of the capsule itself may not be critical so long as the same is capable of containing the color precursor or the color activator and the capsules are capable of being ruptured upon impact in accordance with conventional tape application procedures. The microcapsules are designed to be pressure rupturable such that they release the color activator and the color precursor upon application of pressure. The properties to be considered in making an encapsulated pressure-chromic indicator for this tape application are: (1) the concentration of the color precursor to developer to control the intensity of the color that appears once the capsules are ruptured and the fade-resistance of the color; and (2) the strength of the capsules to control activation sensitivity. The strength of the capsules can be altered by increasing or decreasing the thickness of the wall material and/or by changing the composition of the wall material. These are techniques known to microencapsulation engineers such as those who work for the companies identified above.

In another embodiment of the invention, one of the color reactants can be dispersed in a layer such as a plastisol as described in U.S. Pat. No. 4,212,153.

In another embodiment, one of the color precursor or the color activator may be stationary and in the form of a printed word or graphic, and when the two contact one another a color may emerge in the form of the printed image, for example, "ADHERED" or a symbol such as a check mark may appear. However, a simple uniform color appearing across the tape is likely simpler and a better indication of the consistency of the pressure used to adhere the tape.

EXAMPLE

Figure 5:
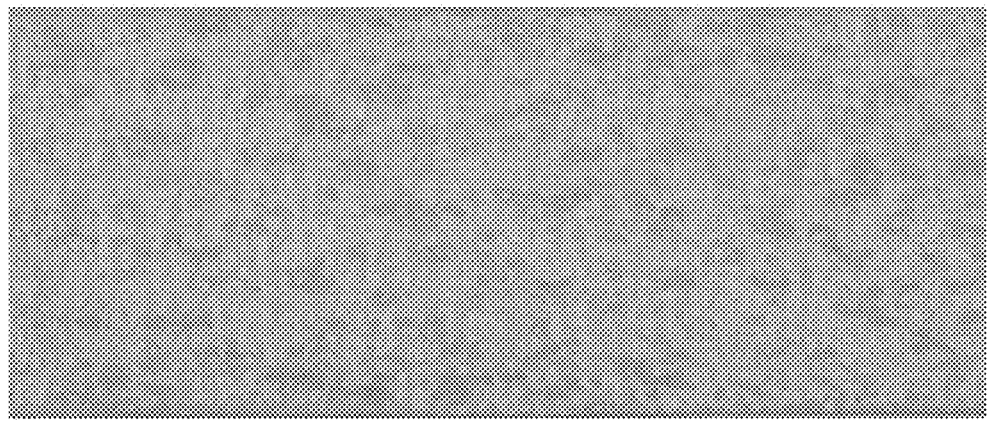
FIG. 5 is an enlarged photograph of a piece of pressure-chromic tape removed from a roll of pressure-chromic tape.
Figure 6:
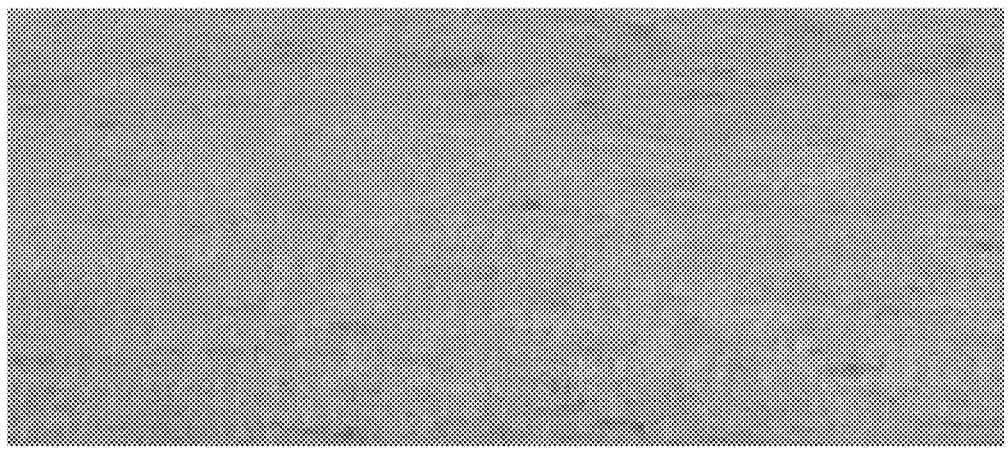
FIG. 6 is an enlarged photograph of a slightly activated piece of tape from the same roll of pressure-chromic tape as the piece shown in FIG. 5. A small amount of pressure was applied to activate the pressure-chromic indicator, such that some dark blue color is visible over portions of the tape.
Figure 7:
FIG. 7 is an enlarged photograph of a more fully activated piece of tape from the same roll of pressure-chromic tape as the piece shown in FIG. 5. A larger amount of pressure was applied to activate the pressure-chromic indicator than applied to the tape in FIG. 6, such that the majority of the surface area of the tape appears dark blue.

A 29.5 lb. fine crepe technical grade paper backing was saturated at 40% pickup and dried. The saturated paper backing had a top side, referred to a release side, and a bottom side, referred to as an adhesive side. A barrier coating was subsequently applied at a dried weight of 3 lb./ream directly to the release side of the saturated paper backing. Then, as a third step, an aqueous pressure-chromic ink that turns blue when activated and having a 1:10 ratio of microencapsulated dye to a developer was applied onto the barrier coating at a final dried weight of 4 lb./ream. Next, an SIS-based adhesive formulated for painters tape applications was coated onto the adhesive (bottom) side of the sheet to provide a dry weight of 21 lb./ream while a standard release coating designed to release this adhesive was applied to the layer of pressure-chromic ink to provide a dry weight of 5 lb./ream. The tape was rolled onto a core to form a roll of tape. Thereafter, strips of 1 inch wide pieces of tape were removed from the roll and were rubbed down onto a surface to demonstrate the color change that results from differing amounts of pressure. No pressure applied to a piece of the tape is shown in the photograph included as FIG. 5, light pressure applied to a piece of the tape is shown in the photograph included as FIG. 6, and heavier (increased) pressure applied to a piece of the tape is shown in the photograph included as FIG. 7. Note how the color change to the dark blue color provided by the pressure-chromic indicator increases in intensity and in coverage of the surface area of the tape with increased pressure. The selected pressure to activate the pressure-chromic indicator should be approximately equal to the pressure that provides the optimum adhesion of the pressure-sensitive adhesive to the adherend.

This example provides one embodiment of a method of making the pressure-chromic tape. A backing that has a top surface, a bottom surface, and at least a first edge extending between the top surface and the bottom surface is provided. A layer of adhesive is applied onto the bottom surface of the backing and a release structure is applied onto the top surface of the backing. These layers may be simultaneously or sequentially applied to the backing in any order. Within the release structure, the pressure-chromic indicator and the release layer may be one layer or may be two layers. When present as two layers, the layers may be applied simultaneously or sequentially by continuously applying, spot-coating, printing, extruding or other known techniques to one or both layers onto the top surface of the backing. In another embodiment, the pressure-chromic indicator may be applied, dried, and thereafter over-coated with the release layer.

In another embodiment, the pressure-chromic tape includes a barrier layer as part of the release structure. Here, the barrier layer is applied directly to the top surface of the backing. The method of applying the barrier layer may be the same as those discussed above for the other layers within the release structure. During manufacturing in a continuous process, the barrier layer may be applied simultaneously or sequentially with the pressure-chromic indicator and the release layer. In one embodiment, these three layers of the release structure are applied sequentially in the following order: barrier layer, pressure-chromic indicator (Which may also be a layer), release layer.

Having described the invention in detail and by reference to preferred embodiments, it will be apparent that modifications and variations thereof are possible without departing from the scope of this invention. The tape is preferably a masking tape, but is not limited thereto.

What is claimed:

1. A masking tape comprising:
   a backing having a top surface, a bottom surface, and at least a first edge extending between the top surface and the bottom surface;
   a layer of adhesive on the bottom surface of the backing; and
   a release structure on the top surface of the backing, the release structure comprising:
   a pressure-chromic indicator and a release layer;
   wherein the pressure-chromic indicator is not activated by the pressure applied during the manufacturing process, but is activated by the pressure applied when the tape is rubbed or dispensed onto an adherend.

2. The masking tape of claim 1 wherein the pressure-chromic indicator is present as a separate layer from the release layer, and the release layer is the outermost layer of the tape.

3. The masking tape of claim 1 wherein the release structure further comprises a barrier layer, the barrier layer being the innermost layer in contact with the top surface of the backing and the release layer being the outermost layer.

4. The masking tape of claim 3 wherein the pressure-chromic indicator is present as a separate layer from the release layer and is disposed between the barrier layer and the release layer.

5. The masking tape of claim 1 wherein the pressure-chromic indicator comprises a color precursor and a developer, wherein at least one of the color precursor and the developer is microencapsulated.

6. The masking tape of claim 5 wherein the pressure-chromic indicator is one part color precursor to ten parts developer.

7. The masking tape of claim 6 wherein the color precursor is electron-donating and the developer is electron-accepting.

8. The masking tape of claim 1 wherein the backing includes a saturant.

9. The masking tape of claim 8 wherein the backing comprises Kraft paper.

10. The masking tape of claim 1 wherein the pressure-chromic indicator has a fade resistance of at least an hour.

11. A method of making an adhesive tape comprising:
   providing a backing that has a top surface, a bottom surface, and at least a first edge extending between the top surface and the bottom surface;
   applying a layer of adhesive onto the bottom surface of the backing; and
   applying a release structure on the top surface of the backing, the release structure comprising:
      a pressure-chromic indicator and a release layer;
   wherein the pressure-chromic indicator is not activated by the pressure applied during the method of making, but is activated by the pressure applied when the tape is rubbed or dispensed onto an adherend.

12. The method of claim 11 wherein the applying of the release structure includes continuously applying, spot-coating or printing the pressure-chromic indicator on the backing and subsequently over-coating the pressure-chromic indicator with the release layer.

13. The method of claim 11 wherein the release structure further comprises a barrier layer, and the method further includes applying the barrier layer directly to the top surface of the backing before applying the pressure-chromic indicator and the release layer.

14. The method of claim 13 wherein the pressure-chromic indicator is present as a separate layer from the release layer, and the method includes applying the pressure-chromic indicator to the barrier layer and then subsequently applying the release layer over the pressure-chromic indicator.

* * * * *